Jan. 8, 1952     A. D. L. HUTCHINSON     2,581,662
DUMP TRUCK

Filed March 7, 1947     3 Sheets-Sheet 1

INVENTOR
A. D. L. HUTCHINSON
BY
Cook + Robinson
ATTORNEYS

Jan. 8, 1952     A. D. L. HUTCHINSON     2,581,662
DUMP TRUCK

Filed March 7, 1947     3 Sheets-Sheet 3

INVENTOR
A. D. L. HUTCHINSON
BY Cook + Robinson
ATTORNEYS

Patented Jan. 8, 1952

2,581,662

UNITED STATES PATENT OFFICE 2,581,662

DUMP TRUCK

Archibald D. L. Hutchinson, Seattle, Wash.

Application March 7, 1947, Serial No. 733,079

8 Claims. (Cl. 298—19)

This invention relates to improvements in dump trucks, or like vehicles wherein a load carrying body is hingedly mounted at one end upon a supporting frame and is adapted to be raised at its other end to a load dumping or unloading position by devices used in conjunction with a hydraulic or pneumatic jack mechanism. More specifically stated, the present invention relates to improvements in the arrangement of devices for actuating the dump body between raised and lowered positions, particularly with respect to the means for and manner of mounting the jack cylinder so that it may be double acting on any linkage by which the cylinder may be operatively connected with the dump body for its actuation.

To impart a better understanding of my invention, it will here be explained that it is now common in present day dump trucks to employ a hydraulic jack for the raising of the dump body from loading to a dumping position, and it is quite advantageous that the jack cylinder be located directly beneath the dump body, but in such location it is necessarily required that it be so disposed with respect to the devices that connect its piston rod with the dump body, that a very great amount of power is required to start the lifting operation, thus the heretofore used arrangements of devices, levers or linkage that operatively connect the jack with the dump body, have necessitated jack cylinders of substantial diameter and exceedingly heavy construction to withstand this excessive initial strain.

In view of the foregoing explanatory matter, it has been the principal object of this invention to provide an improved dump body actuating mechanism involving a jack cylinder that has a double acting connection with the dump body actuating mechanism whereby a more effective application and use of power from the jack, especially at the start of a lifting operation, is made possible and the use of a jack cylinder of lesser diameter and parts of lesser weight than is ordinarily used is made possible.

It is also an object of my invention to provide a double acting jack cylinder and novel linkage arrangement in connection therewith whereby the lifting power of the jack is utilized in a direct upward lift on the dump body at a more constant pressure throughout the entire lifting operation and eliminates excess pressures at any point.

Another object of the invention is to provide a rear dump body arrangement wherein the initial application of hydraulic power to the jack in lifting a load results in forward travel of the jack cylinder, and an arrangement of parts in connection therewith whereby the power that causes such forward movement, be applied substantially directly upward for the lifting movement of the dump body.

Still further objects of the invention reside in the details of construction, in their combination and mode of operation as will hereinafter be fully described.

In accomplishing these and other objects of the invention, I have provided the improved details of construction, the preferred forms of which are illustrated in the accompanying drawings, wherein—

Figure 3:
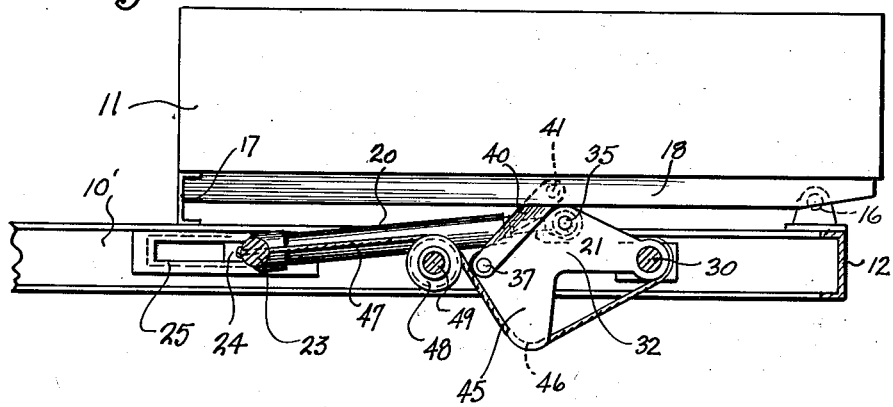
Figure 4:
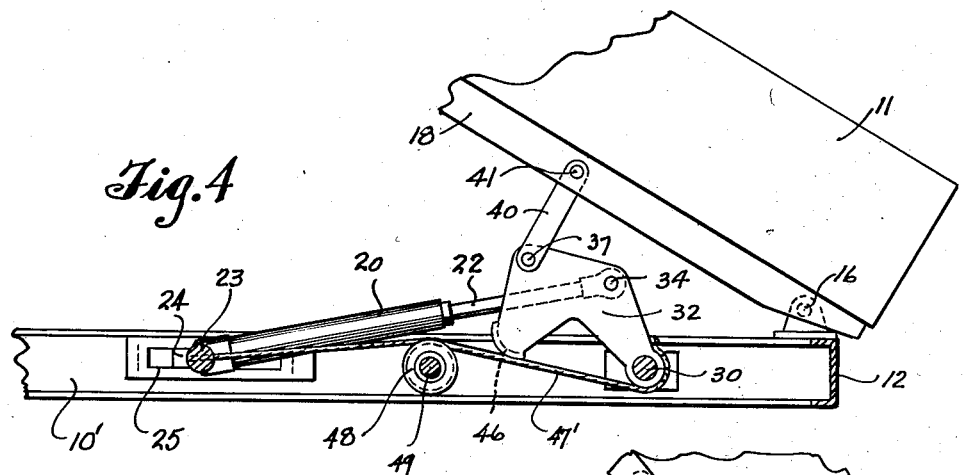
Figure 5:
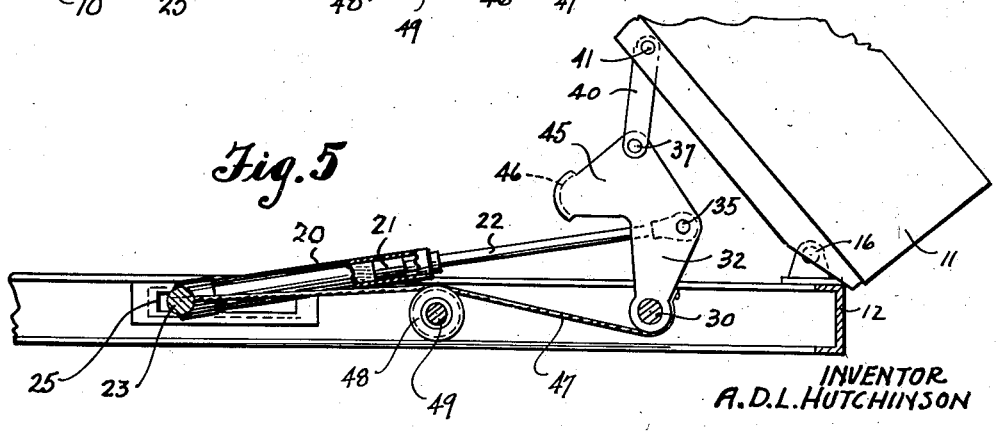

Figs. 3, 4 and 5, respectively, diagrammatically illustrate the relationship of the parts of the mechanism at the start, during, and at the end of a lifting operation.

Referring more in detail to the drawings—

10 and 10', respectively, designate the opposite, longitudinal side beams of a dump truck frame structure on which a dump body 11, which may be of any suitable kind, is mounted for loading and dumping. As shown best in Fig. 2, the rear ends of the beams 10 and 10' are rigidly joined by a cross beam 12. The dump body 11 is of that type designed and equipped for rear end dumping and it is intended that it be mounted on the vehicle frame by suitable, transversely aligned hinge connections such as indicated at 16—16 in Fig. 2; these connections being located at the rear end of the vehicle frame and connect with a cross beam fixed to the bottom of the dump body near its rear end.

The dump body is here shown as being equipped at its front end with a transverse beam 17 that is adapted to rest upon the longitudinal beams 10 and 10' of the vehicle frame when the dump body is in lowered position. Also, the dump body is shown as being equipped with longitudinal base beams 18, located beneath the bottom or floor of the body to which the operating linkage is attached as presently explained.

Figure 2:
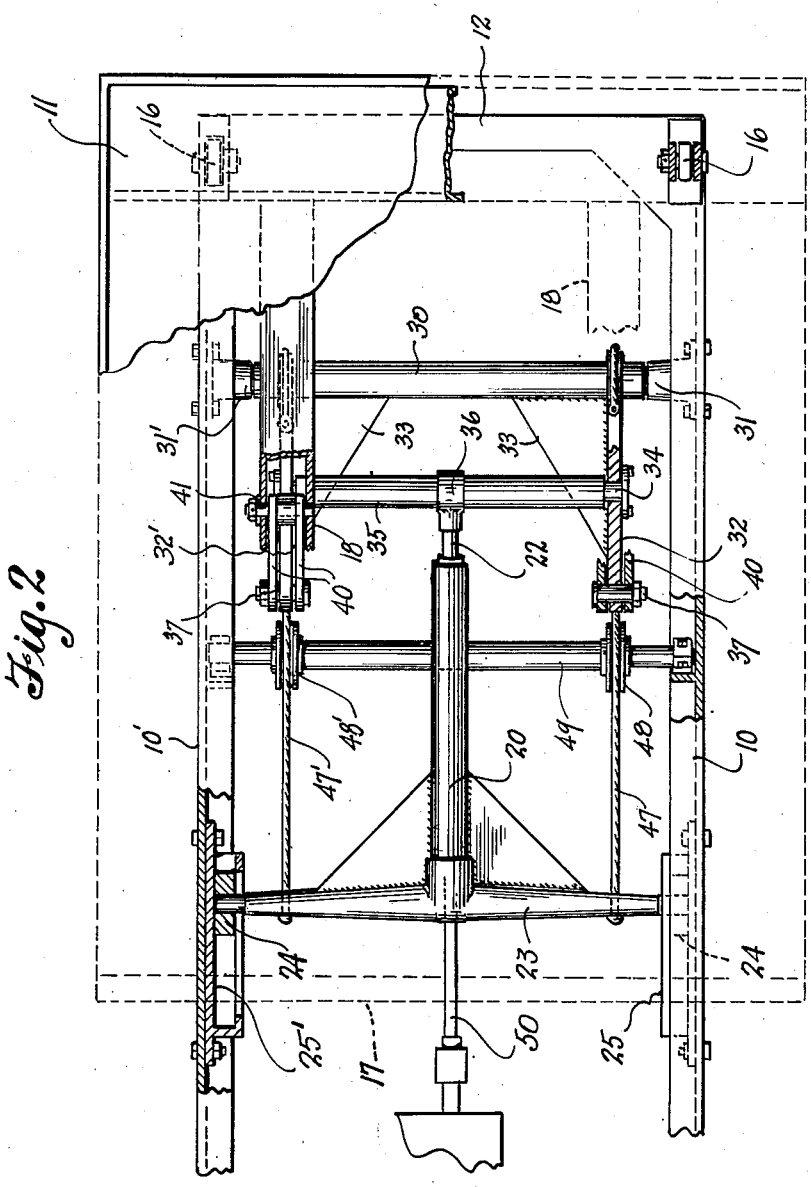
Fig. 2 is a plan view of the dumping mechanism.

The body dumping mechanism is located beneath the dump body 11 and while it is here shown as being disposed between the beams 10—10', it is to be understood that it might be outside, these, or at the sides of the body, as may be required or formed most practical for any particular vehicle. This dumping mechanism comprises a hydraulic cylinder 20 in which a piston 21 and piston rod 22 are reciprocally contained. The cylinder 20 is mounted on the vehicle frame in a longitudinal vertical plane thereof. It might be centrally located, or used at the side or other suitable location. In its present application, the cylinder is rigidly secured to a cross shaft 23 that extends horizontally between the beams 10 and 10' of the truck frame and at its ends is pivotally contained in bearing blocks 24 that are mounted for limited forward and rearward travel in horizontal guideways 25—25' that are fixed respectively to the beams 10 and 10', as best shown in Fig. 2.

The guideways 25—25', as herein illustrated, are located in the truck frame below the forward end portion of the lowered truck body. They might be otherwise suitably fixed or mounted upon the frame. Extended between the beams 10 and 10' near the rear end of the truck frame and forwardly of the body mounting hinges 16—16, is a cross shaft 30, rotatably contained at its opposite ends in bearings 31 and 31' that are fixed to the beams 10 and 10', respectively. Extended forwardly and perpendicularly from this cross shaft, and in the same axial plane, are paired spaced apart lever arms 32 and 32'; these being braced from shaft 30 by webs 33 as noted best in Fig. 2. Extended directly between the arms 32 and 32', and securely mounted at its opposite ends therein, as at 34, is a cross shaft 35 to which the outer end of the piston rod is operatively affixed as at 36 in Fig. 2.

Figure 1:
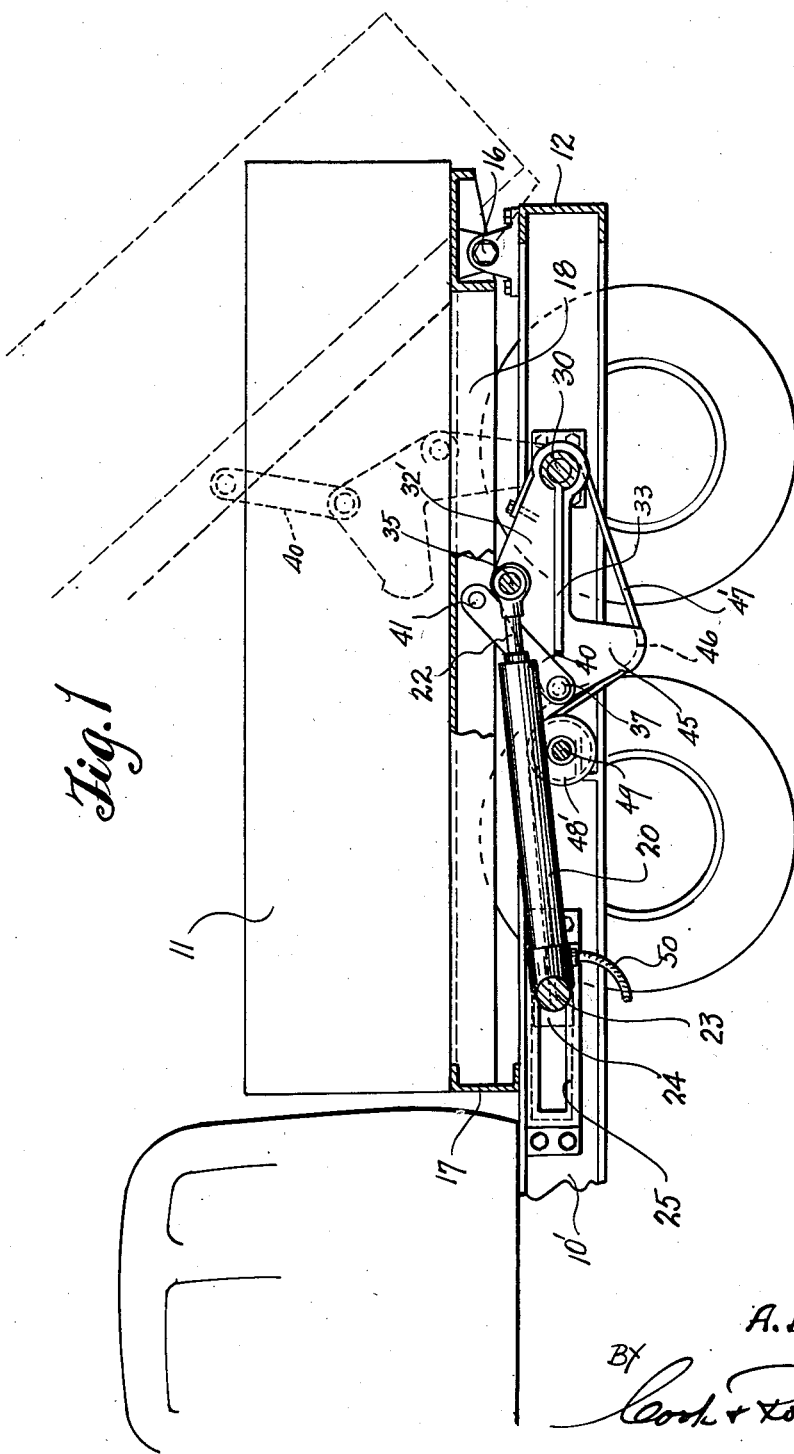
Fig. 1 is a longitudinal sectional view in a vertical plane of a dump truck illustrating a body dump mechanism embodied by the present invention.

At their outer ends, each of the arms 32 and 32' is pivotally attached, as at 37, to ends of paired links 40 and these links are pivotally connected at their other ends, as at 41 in Fig. 1, with the dump body.

The arrangement of the above mentioned cross shafts, arms and links of the dump body operating mechanism is such that when the arms 32 and 32' are caused to swing upwardly incident to an application of power to the hydraulic jack, their connection with the dump body through mediacy of the links 40, will actuate the dump body upwardly from its lowered position, as shown in Fig. 3, and this may continue through the position of Fig. 4 to the full dumping position in which the body as has been shown in Fig. 5.

It has also been shown that each of the two arms 32 and 32' that extend forwardly from the cross shaft 30, is provided at its forward end with a downwardly extended portion, or leg 45, of substantial length, and each of these is formed along its lower edge portion, in the longitudinal direction of the arm, with a downwardly facing cable seat 46. Corresponding to the arms 32 and 32' are cables 47—47' affixed at their forward ends to the cross shafts 23 as noted best in Fig. 2. These cables extend rearwardly from the shaft, over cable guide sheave wheels 48 and 48', respectively that are rotatably supported on a cross shaft 49 that is mounted transversely in the truck frame forwardly of the forward ends of arms 32 and 32', and from these sheaves the cables extend rearwardly, and downwardly, each being applied within the cable seat 46 of the corresponding arm 32 or 32', and continue therefrom rearwardly and about the underside of the cross shaft 30 and at their ends are fixed to the arms 32 and 32'. It is shown in Fig. 2 that the cables are disposed in the vertical planes of the arms 32 and 32' and in Fig. 1 it is shown that the cables are drawn taut and are of such length that when the dump body is in its fully lowered position, they will operate by reason of their connection with the cross shaft 23, to retain the cylinder at its rearward limit of travel as provided for by mounting the ends of the cross shaft in the longitudinal guideways 25.

It is anticipated that a hydraulic pressure medium may be applied to the forward end of the jack cylinder by any suitable means such, for example, through a flexible conduit as shown at 50 in Fig. 1, and the pressure medium would be supplied to this conduit by any suitable pump mechanism under control of valve mechanism, not herein shown.

Assuming the dump body mechanism to be so constructed and arranged and with the understanding that when the body is in lowered position the parts assume the relative position in which they are shown in Fig. 3, it will be understood then that should it be desired to raise the body to a dumping position, the hydraulic pressure medium would be admitted into the jack cylinder to effect a relative outward extension of the piston rod from the cylinder. By reason of the relationship of the jack and the arms 32 at this time, the first application of power to the cylinder will cause the cylinder 20 to be pushed forwardly and the piston rod 22 rearwardly to the extent provided for by the resultant upward swing of the arms 32. Thus through the cable connections, 47—47', and the tendency of the cables to straighten out between the supporting sheave wheels 48 and the cross shaft 30, the arms 32 and 32' will be lifted, by a substantially direct upward pull of the cables applied at point 46 in Fig. 1, by the full power of the hydraulic medium.

During this application of pressure medium to the cylinder, and the incident upward swing of arms 32—32', the piston rod 22 will move rearwardly along with forward movement of the cylinder. In other words, the position of cylinder and rod will be established in accordance with the lifting of the body and conditions of leverage and cable tension as the power is applied.

As the cylinder moves forwardly the leverage of the cables acting on the arms 32—32' decreases and the leverage at point of connection 36, increases. When leverage at 36 is sufficient, forward motion of the cylinder may be stopped and the dumping cycle completed by the extending of the piston rod.

The lowering of the body is effected by the weight of the body and may be controlled by the exhaustion of the pressure medium from the cylinder.

The main advantage of this mechanism resides in the fact that the double acting movement of the jack provides for a direct application of lifting force by the cables 47, acting at points 46 through the arms 32 to initially lift the body unit to a position at which a leverage relationship will be obtained through the connection of the piston rod and the arms, that is advantageous and whereby dumping of the body can be effected with greater efficiency of piston head area. Thus, the use of heavy cylinders, linkage and levers is to a material extent reduced especially in so far as the hydraulic jack is concerned. The use of a cylinder of smaller diameter permits lowering the dump body closer to the frame and this is advantageous.

It is apparent that in lieu of the cables shown, other forms of linkage or connections might be provided whereby the forward travel of the cylinder would operate to transmit a similar upward lift on the arms 32 at the start of the dumping operation, for example, a bell crank mechanism pivoted on the frame with one arm connected to the cross shaft 23 and its other arm arranged to effect upward lifting force on arm 32, when the cross shaft is shifted forwardly. Therefore, it is not the intent that these claims be restricted to details of linkage.

Having thus described my invention, what I claim is new therein and desire to secure by Letters Patent, is:

1. In a dump truck, a frame structure, a dump body, and a body dumping arm pivoted on the frame and having operative connection with the body for moving it between loading and dumping positions, a jack mounting means movable in the frame toward and from the pivot point of the dumping arm, a double acting jack comprising a cylinder with piston rod extended therefrom, one of which parts is pivotally supported by the jack mounting means and the other pivotally connected to said dumping arm for its actuation, said dumping arm and jack being adapted to swing toward each other and to move substantially into alignment when the body moves to its loading position and a retracting means for the jack mounting means actuated by movement of said dumping arm as the body moves to its lowered position to shift the jack mounting means toward the pivot point of the body dumping arm and through which retraction means, in a body lifting operation, a part of the initially applied load lifting force of the jack will be sustained and transmitted as direct lifting force against the arm.

2. In a dump truck having a body supporting frame and a dump body hinged thereto; a body dumping mechanism comprising a body dumping arm pivotally fixed at one end to the said frame and having a lifting connection at its other end with said body, a double acting jack having means at its forward end pivotally mounting it in said frame and adapted for limited movement toward and from the pivotal mounting of the said body dumping arm and said jack having an operating connection at its other end with said dumping arm; said jack and said dumping arm being adapted to swing toward each other about their pivot axes, substantially into alignment with the movement of said dump body to its lowered position, and means connected to said forward end of the jack and operable by movement of that portion of the jack away from the pivot point of the dumping arm, to transmit a direct uplifting force to the body dumping arm.

3. In a dump truck having a body supporting frame and a dump body hinged thereto; a body dumping mechanism comprising a lever arm pivotally fixed at one end to the said frame and having a lifting connection at its other end with said body, a double acting jack pivotally mounted at its forward end in said frame and adapted for limited movement toward and from the pivotal mounting of the said lever arm and having an operating connection at its rearward end with said lever arm; said jack and said lever arm being adapted to swing toward each other on their pivotal mounting substantially into alignment with the movement of said dump body to its lowered position and flexible means connected to said jack and to the frame and operable by direct contact of the lever arm therewith as the body moves to lowered position, to shift the jack to its position nearer the arm mounting pivot, and whereby the forward end portion of the jack is allowed to move away from the arm pivot as the load is lifted and through which means reactive force is sustained incident to lifting the load, and this force transmitted in part, as a direct upward lifting force to the swinging end of the arm.

4. In a dump truck having a body supporting frame and a dump body hinged thereto; a body dumping mechanism comprising a lever arm pivotally fixed at one end to the frame and having a lifting connection at its other end with the body, a jack cylinder containing a piston, a rod extended from the piston and operatively connected with said lever arm for its functional actuation, a mounting for said jack cylinder adapted to be moved in said frame toward and from the pivot point of the arm; said arm and cylinder being adapted to swing toward each other and substantially into alignment when the body moves to its lowered position, and a cable connecting the said cylinder mounting and said arm, and adapted to be contacted by the arm in the final lowering movement of the body to shorten the distance between its points of connection with the cylinder mounting and arm, thus to shift the jack mounting toward the arm, and whereby upward swing of the arm allows the jack mounting to move in the opposite direction and through which cable the latter movement of the jack mounting will transmit a direct upward lifting force to the said lever arm.

5. In a dump truck having a body supporting frame and a dump body hinged thereto; a body dumping mechanism comprising a lever arm pivotally fixed at one end to the frame and having a lifting connection at its other end with the body, a jack cylinder containing a piston, a rod extended from the piston and operatively connected with said lever arm for its functional actuation, a mounting for said jack cylinder movable in said frame toward and from the pivot joint of the arm; a cable fixed at one end in the frame, and at its other end to the jack mounting and adapted to be engaged by the arm, in a body lowering operation, to move the jack mounting toward the arm and, with the raising of the arm, to permit the jack mounting to move in the opposite direction, and through which cable the lifting force as sustained by said movable mounting will be transmitted to the arm as direct lifting force.

6. In a dump truck having a body supporting frame and a dump body hinged thereto; a body dumping mechanism comprising a lever arm pivotally fixed at one end to the frame and having a lifting connection at its other end with the body, a jack cylinder containing a piston, a rod extended from the piston and operatively connected with said lever arm for its functional actuation, a mounting for said jack cylinder movable in said frame toward and from the pivot point of the arm; a flexible connector fixed at one end in the frame and at its other end to said jack mounting, and said arm having a leg extended downwardly therefrom to engage against said flexible connector in the final movement of the body in a lowering operation to deflect it downwardly and whereby the downward swing of the arm will operate to pull the jack toward the arm and through which the force of weight sustained by the jack at the start of a lifting operation will be transmitted, in part, as a direct upwardly applied force to the arm.

7. In a dump truck having a body supporting frame and a dump body hinged thereto; a body dumping mechanism comprising a lever arm pivotally fixed at one end to the frame and having a lifting connection at its other end with the body, a jack cylinder containing a piston and rod extended therefrom, and pivotally connected to said lever arm, a mounting for said jack movable in said frame toward and from the pivotal point of the arm, said arm and jack being adapted to swing substantially into alignment when the body is lowered, a sheave wheel mounted in the frame adjacent the outer end of said arm in its lowered position, a cable attached to the jack mounting and extended over said sheave and anchored at its end, said arm having a leg extended downwardly from its outer end to engage with and deflect said cable downwardly thus to pull the jack mounting toward the arm, when the body is lowered, and through which the cable force sustained by the jack in a lifting operation will be transmitted to the arm leg to lift the arm.

8. In a dump truck, having a frame structure and a dump body hingedly mounted on said frame structure; a body dumping mechanism comprising a body dumping member movable in the frame, a double acting jack, means mounting the jack at one end for movement in the frame structure toward and from the body hinge, means connecting the other end of the jack with the body dumping member for applying dumping force thereto, and flexible means connecting the jack mounting means with the frame structure whereby its movement away from the hinge is limited and its movement toward the hinge is effected, lifting means on the dumping member adapted to engage and deflect the flexible means when the body moves to its lowered position and through which an initial lifting force will be applied to the dumping member.

ARCHIBALD D. L. HUTCHINSON.

REFERENCES CITED

The following references are of record in the file of this patent:

UNITED STATES PATENTS

| Number | Name | Date |
|---|---|---|
| 1,733,988 | Barnard | Oct. 29, 1929 |
| 2,137,045 | Day | Nov. 15, 1938 |
| 2,190,869 | Frentzel et al. | Feb. 20, 1940 |
| 2,190,870 | Frentzel | Feb. 20, 1940 |
| 2,203,059 | Palm | June 4, 1940 |
| 2,449,863 | Ross | Sept. 21, 1948 |